United States Patent
Happe et al.

(10) Patent No.: US 9,696,033 B2
(45) Date of Patent: Jul. 4, 2017

(54) GAS REGULATOR FITTING

(71) Applicant: Mertik Maxitrol GmbH & Co. KG, Thale, DE (US)

(72) Inventors: Barbara Happe, OT Gernrode (DE); Peter Keil, Thale (DE)

(73) Assignee: MERTIK MAXITROL GMBH & CO. KG, Thale (DE)

( * ) Notice: Subject to any disclaimer, the term of this patent is extended or adjusted under 35 U.S.C. 154(b) by 0 days.

(21) Appl. No.: 14/778,349

(22) PCT Filed: Mar. 17, 2014

(86) PCT No.: PCT/EP2014/000718
§ 371 (c)(1),
(2) Date: Sep. 18, 2015

(87) PCT Pub. No.: WO2014/146777
PCT Pub. Date: Sep. 25, 2014

(65) Prior Publication Data
US 2016/0069565 A1 Mar. 10, 2016

(30) Foreign Application Priority Data
Mar. 18, 2013 (DE) .......... 10 2013 004 745

(51) Int. Cl.
*F23N 1/00* (2006.01)
*F16K 31/00* (2006.01)
(Continued)

(52) U.S. Cl.
CPC ............ *F23N 1/007* (2013.01); *F16K 31/002* (2013.01); *F16L 15/08* (2013.01); *F23N 5/027* (2013.01);
(Continued)

(58) Field of Classification Search
CPC ........ F16K 31/002; F16L 15/08; F23N 1/007; F23N 5/027; F23N 5/067; G05D 7/0676; G05D 23/01
See application file for complete search history.

(56) References Cited

U.S. PATENT DOCUMENTS 2,724,409 A 11/1955 Coffey
2,783,946 A 3/1957 Lansky et al.
(Continued)

FOREIGN PATENT DOCUMENTS

DE 299 05 204 U1 6/1999
DE 10 2009 011611 A1 9/2010

OTHER PUBLICATIONS

English language abstract for DE 10 2009 011611 A1 with an English language equivalent U.S. Patent Application Publication No. 2014/0137954 A1 extracted from www.espacenet.com on Sep. 12, 2015; 11 pages.

(Continued)

Primary Examiner — Kevin Lee
(74) Attorney, Agent, or Firm — Howard & Howard Attorneys PLLC

(57) ABSTRACT

The aim is to provide a gas control valve in which the specified desired value range can be subsequently shifted easily in order to optimize the range of settable temperatures for the heating device without exceeding the device- and/or installation-specific admissible use conditions. To this end, a setting element (17) which serves to change the position of a temperature-sensitive element (8) and thus to actuate a switch for activating a valve has a threaded part (12) that is screwable into the housing (1) of the gas control valve. In this case, the two are connected together in a rotationally secure manner via a releasable locking mechanism, wherein a tubular latching part (14) that is firmly connected to the threaded part (12) is arranged between the pot-like setting (Continued)

element (17), partially surrounding the threaded part (12) with a recess (18), and the threaded part (12). By way of a stop element (16) that protrudes from the end side, the latching part (14) projects into a guiding contour (19) which is formed by an end-side aperture located in the setting element (17).

10 Claims, 4 Drawing Sheets

(51) Int. Cl.
| | |
|---|---|
| *F23N 5/02* | (2006.01) |
| *F23N 5/06* | (2006.01) |
| *G05D 7/06* | (2006.01) |
| *F16L 15/08* | (2006.01) |
| *G05D 23/01* | (2006.01) |

(52) U.S. Cl.
CPC ............ *F23N 5/067* (2013.01); *G05D 7/0676* (2013.01); *G05D 23/01* (2013.01); *F23N 2035/24* (2013.01)

(56) References Cited

U.S. PATENT DOCUMENTS

| | | | |
|---|---|---|---|
| 2,857,103 A | 10/1958 | Hajny | |
| 2,980,386 A * | 4/1961 | Reinhart et al. | G05D 23/128 236/15 A |
| 8,602,047 B2 * | 12/2013 | Happe et al. | F23N 1/007 137/468 |
| 2014/0137954 A1 | 5/2014 | Happe et al. | |

OTHER PUBLICATIONS

English language abstract and machine-assisted English language translation extracted from www.espacenet.com on Sep. 15, 2015; 27 pages.

* cited by examiner

SECTION A-A

DETAILED VIEW B

US 9,696,033 B2

GAS REGULATOR FITTING

RELATED APPLICATIONS

This application is the National Stage of International Patent Application No. PCT/EP2014/000718, filed Mar. 17, 2014, the entire contents of which are hereby incorporated by reference.

TECHNICAL FIELD OF THE INVENTION

The invention relates to a gas regulator fitting for a gas-fired heating device according to the preamble to the first claim.

PRIOR ART

Gas regulator fittings for gas-fired heating devices serve to ignite and control or regulate a gas stream flowing to a burner. At the same time, operator and system safety must be ensured. Normally, a temperature serves here as a controlled variable and is measured by a temperature sensor connected by a capillary line to a temperature-sensitive element, for example metal bellows serving as a lifting element.

A gas regulator fitting for installation in single room heaters and operated without auxiliary energy is known for example from DE 299 05 204 U1. In this gas regulator fitting the switching system of a combined proportional and two position controller controllable by a temperature-sensitive regulating device is arranged in the housing downstream of the main valve. The regulating device comprises a temperature sensor located outside the housing and metal bellows arranged in the gas regulator fitting, both of which are interconnected by a capillary line, with all parts filled with fluid. Such regulating devices work on the principle of the expansion of fluid caused by an increase of temperature. A change in the temperature at the temperature sensor causes a correspondingly directed movement of the metal bellows which is transferred to the switching system.

Such gas regulator fittings have usually been designed for a defined setpoint range and are set accordingly during manufacture. This also applies to the gas regulator fitting described in DE 10 2009 011 611 A1 in which fluctuations in the ambient temperature leading to a varying distortion of the setpoint range set can be compensated.

A simple means of adjustment is desirable, however, especially in the field of culinary technology if this is required to carry out a cooking operation. Such a subsequent adjustment of the setpoint range preset by the manufacturer of the gas regulator fitting in a limited range cannot, however, be made with all these gas regulator fittings described above.

SUMMARY OF THE INVENTION

The object of the invention is to create a gas regulator fitting in which a simple adjustment can subsequently be made of the preset setpoint range in order to optimize the range of the adjustable temperature for the heating device without exceeding the permitted operating conditions for the device and/or system, and in particular without encroaching into the gas-conducting space.

The problem is solved according to the invention in that a setting element, which serves to alter the position of a temperature-sensitive element and thus activate a switch for operating a valve, has a threaded element that can be screwed into the housing of the gas regulator fitting. In this arrangement both are rigidly interconnected by a detachable locking device, wherein a tubular latching part securely connected to the threaded element is arranged between the cup-shaped setting elements partly covering the threaded element with a recess and the threaded element. The latching part protrudes into a guide contour with a stop element projecting on a front face, with said guide contour formed by an aperture located in the setting element on the front side.

A solution has therefore been found enabling the user to make a subsequent adjustment of the setpoint range preset by the manufacturer of the gas regulator. At the same time the adjustment of the setpoint range is restricted by the guide contour such that the permitted operating conditions for the device or system cannot be exceeded. The solution is characterized by its simple structure and mode of operation.

An advantageous embodiment is created if the latching part with a locking collar on at least part of its external cylindrical surface protrudes into a circumferential locking groove located in the inner wall of the recess.

The connection made by locking collar and locking groove between the setting ring and the latching part provides an additional safeguard in this embodiment in that an adjustment of the setpoint range, which causes the permitted operating conditions to be exceeded and is made by removing the stop element from the guide contour after disassembling these parts, cannot be carried out non-destructively.

BRIEF DESCRIPTION OF THE DRAWINGS

The invention is described is more detail below by means of a detailed description of the preferred embodiments. The illustrations show the following.

DETAILED DESCRIPTION OF THE PREFERRED EMBODIMENTS

Figure 1:
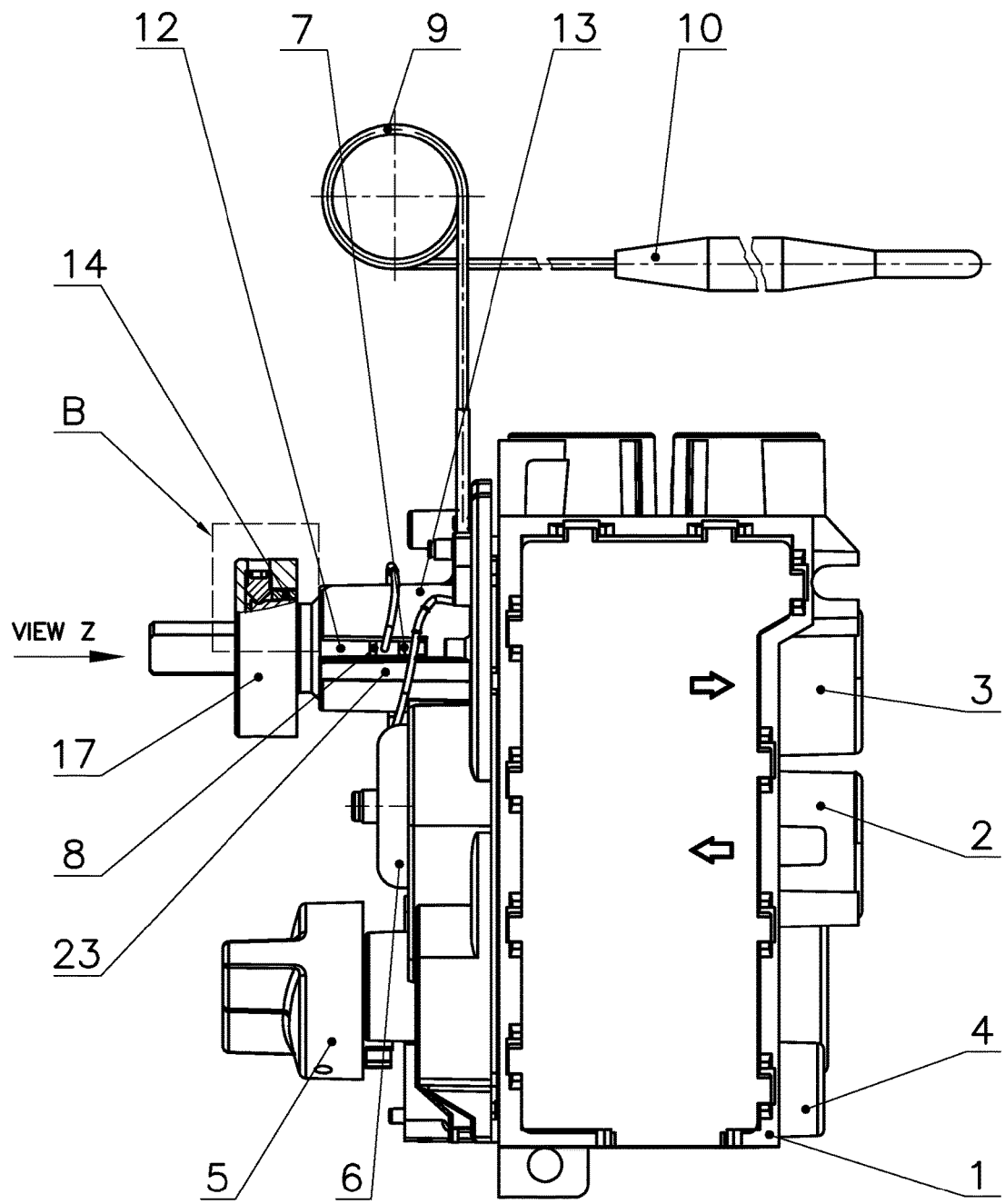
FIG. 1 a gas regulator fitting according to the invention

The exemplary embodiment of the gas regulator fitting according to the invention shown in FIG. 1 is a switching and control device preferably intended for a gas-fired heating device or the like. It enables a burner to be operated and monitored, the pressure to be controlled as well as the required temperature to be set and controlled by regulating the volume of gas flowing to the burner.

The gas regulator fitting comprises a housing 1 with a gas inlet 2 identified by a directional arrow and a gas outlet 3 also identified by a directional arrow as well as an ignition gas outlet 4. The following functional elements looked at in the direction of flow of the gas are accommodated in the housing 1:

- Start-up with associated operating element 5
- Safety pilot valve and main valve with safety interlock device
- Pressure regulator 6
- Switching system of a combined proportional/two position controller for regulating the volume of gas flowing to the burner A detailed description and explanation of details have not been given in this execution example because the structure and mode of operation of the start-up, the safety pilot valve and the main valve, the pressure regulator 6 and the switching system are known to those skilled in the art.

A valve forming part of the switching system regulating the volume of gas flowing to the burner can be controlled by a switch also forming part of the switching system.

A longitudinally movable tappet 7 is connected non-positively to the switch. It protrudes from the gas-conducting space of the housing 1 and is supported with its end facing away from the switch on a temperature-sensitive element 8, a metal bellows. The metal bellows 8 is connected by a capillary line 9 to a temperature sensor 10. Metal bellows 8, capillary line 9 and temperature sensor 10 are filled with a thermoactive fluid.

In order to set a temperature during manufacture, a threaded piece 12, which can be screwed into a thread located in the interior of a tubular attachment 13 forming part of the housing 1, is supported, in this execution example conveniently by means of an intermediately mounted ball 11, on the metal bellows 8 on its side facing away from the tappet 7.

Figure 3:
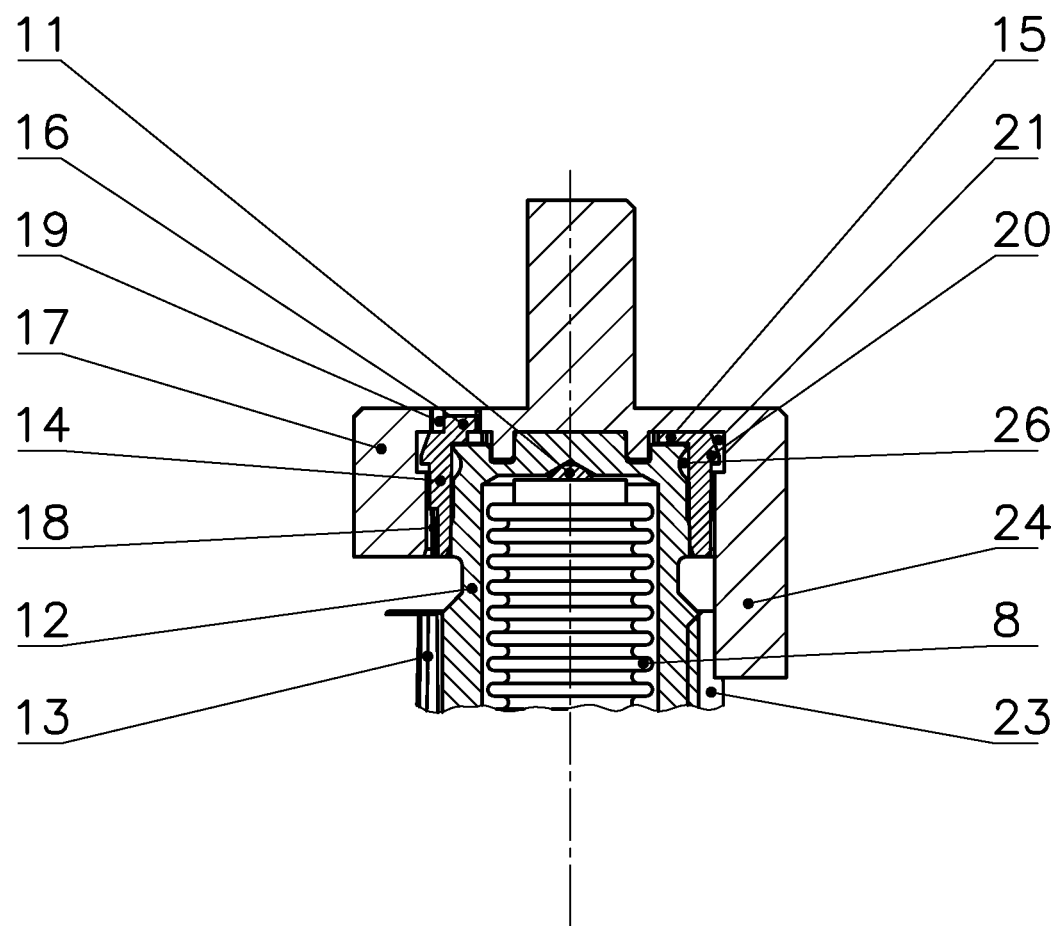

In addition, a tubular latching part 14 is pressed securely and, in particular, rigidly on the threaded element 12. To that end the circumferential area of the threaded element 12 in this area has additionally been provided with a ridge. The pressed on latching part 14 is supported on the face of the threaded element 12 by a circumferential inner collar 15. In addition, the collar 15 has on its front side facing away from the threaded element 12 a projecting stop element 16 the function of which is explained in more detail below (FIG. 3).

Figure 2:
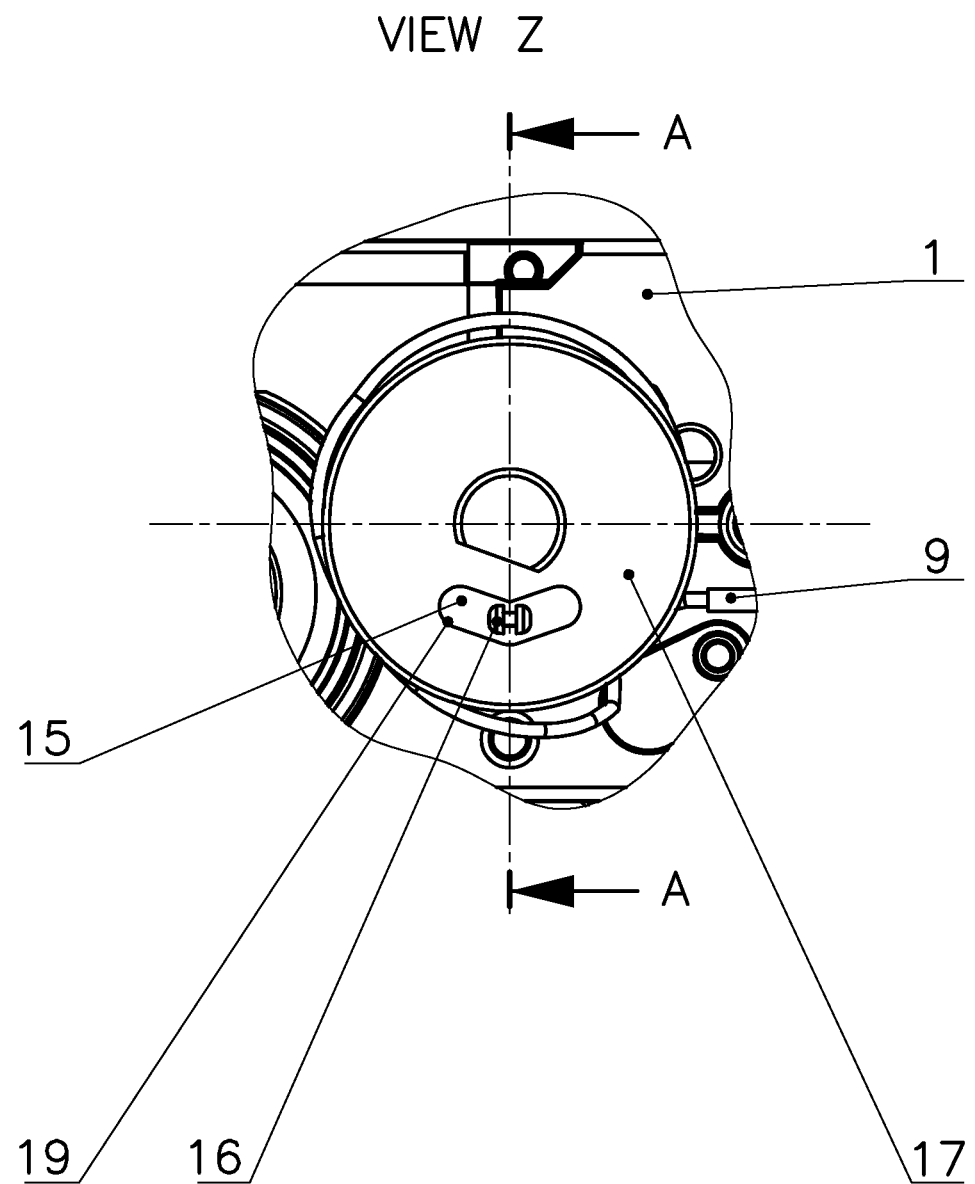
FIG. 2 an enlarged view Z from FIG. 1 of the gas regulator fitting according to the invention FIG. 3 an enlarged cross-sectional view A-A from FIG. 1 of the gas regulator fitting according to the invention.

A cup-shaped setting element 17 is fitted axially on the latching part 14 such that it covers with its recess 18 the latching part 14 and partly covers the threaded element 12. as well An aperture located in the front face of the setting element 17 serves here as guide contour 19 for the stop element 16 (FIG. 2) which protrudes into said aperture and has already been described above. In order to avoid disassembling the setting element 17 and latching part 14 to remove the stop element 16 from the guide contour 19 the latching part 14 has on at least part of its external cylindrical surface a locking collar 20, which protrudes into a circumferential locking groove 21 located in the inner wall of the recess 18.

In addition, there is a locking device in the setting element 17 for a rigid connection to the threaded element 12. In this execution example it is formed by two opposing screws 22 which can be screwed into the circumferential area of the setting element 17.

Figure 4:
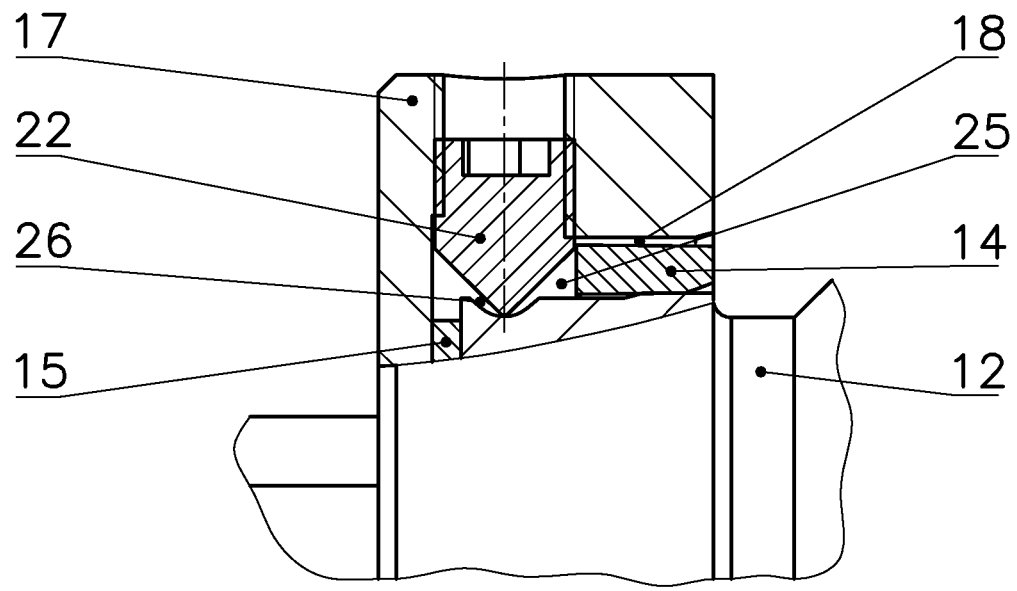
FIG. 4 an enlarged detailed view B from FIG. 1 of the gas regulator fitting according to the invention from FIG. 1.

The latching part 14 has, of course, cut-outs 25 in these areas to enable the required secure connection to be made between setting element 17 and threaded element 12. The connection can be made even more secure (FIG. 4), as in this execution example, by using screws 22 that are provided with a tip, and a circumferential groove 26 made in the threaded element 12 and into which the screws 22 can be screwed.

The stops required for restricting the rotational movement of the setting element 17 are formed by a rib 23 located on the attachment 13 of the housing 1 and a partial extension 24 of the circumferential area of the setting element 17.

In order to set, as is the customary practice, a required temperature value from the setpoint range preset by the manufacturer of the gas regulator fitting, the setting lo element 17 is turned within the setting range limited by the stops formed by rib 23 and extension 24.

If the user is now to make a subsequent adjustment to the setpoint range preset by the manufacturer of the gas regulator fitting, the locking device between is threaded element 12 and setting element 17 is first to be unlocked. The setting element 17 can then be turned within the range preset by the guide contour 19 and the stop element 16. The locking device is then to be re-locked.

The setpoint range cannot be extended further because the connection between setting element 17, latching part 14 and threaded element 12 cannot be undone non-destructively.

LIST OF REFERENCE NUMERALS

1 Housing
2 Gas inlet
3 Gas outlet
4 Ignition gas outlet
5 Operating element
6 Pressure regulator
7 Tappet
8 Temperature-sensitive element
9 Capillary line
10 Temperature sensor
11 Ball
12 Threaded element
13 Attachment
14 Latching part
15 Collar
16 Stop element
17 Setting element
18 Recess
19 Guide contour
20 Locking collar
21 Locking groove
22 Screw
23 Rib
24 Extension
25 Cut-out
26 Groove

The invention claimed is:

1. A gas regulator fitting for a gas-fired heating device, the gas-fired heating device including a main burner, the gas regulator fitting comprising:
 a housing (1) defining a gas flow path in a gas-conducting area of the housing (1);
 a main valve accommodated in the housing (1) and disposed in the gas flow path;
 at least one second valve accommodated in the housing (1) and disposed downstream of the main valve in the gas flow path;
 a switching system accommodated in the housing (1) and operative to regulate a volume of gas flowing to a main burner; the switching system comprising a longitudinally moveable tappet (7), a temperature-sensitive element (8) and a setting element (17); the setting element (17) comprising an aperture, wherein the temperature-sensitive element (8) is coupled to the setting element (17) and operates to alter a position of the longitudinally movable tappet (7);
 the switching system further comprising a threaded element (12) and a latching part (14), the threaded element (12) in threaded engagement with the housing (1), the latching part (14) rigidly secured to the threaded element (12), the latching part (14) including a projecting stop element (16) extending in a direction opposite the threaded element (12), the setting element (17) coupled to the latching part (14) such that the projecting stop element (16) protrudes into the aperture, wherein a removable locking device (22) secures the setting element (17) to the threaded element (12).

2. The gas regulator fitting of claim 1, wherein the latching part (14) comprises a locking collar (20); and wherein the setting element (17) comprises a locking groove (21), such that the locking collar (20) protrudes into the locking groove (21).

3. The gas regulator fitting of claim 1, wherein the temperature-sensitive element (8) is a metal bellows.

4. The gas regulator fitting of claim 1, wherein the temperature-sensitive element (8) is coupled to the setting element (17) via the threaded element (12).

5. The gas regulator fitting of claim 4, wherein the temperature-sensitive element is support by a ball (11) on the threaded element (12).

6. The gas regulator fitting of claim 1, wherein the setting element (17) is cup-shaped such that the setting element (17) partly covers the threaded element (12).

7. The gas regulator fitting of claim 1, wherein the aperture forms a guide contour (19) for the stop element (16).

8. The gas regulator fitting of claim 1, wherein the removable locking device (22) comprises a screw having a tip, and wherein the threaded element (12) includes a groove for accommodating the tip of the screw.

9. The gas regulator fitting of claim 1, wherein the housing includes ribs (23) and the setting element (17) includes an extension (24) for engaging the ribs (23) such that a rotational movement of the setting element (17) relative to the housing (1) is restricted within a setting range.

10. The gas regulator fitting of claim 9 configured such that the setting range is adjustable within the range defined by the stop element (16) protruding into a guide contour (19).

\* \* \* \* \*